Dec. 7, 1926.
P. S. SINCLAIR
1,609,580
COMBINED VALVE SEAT AND PACKING RING
Filed Jan. 8, 1924
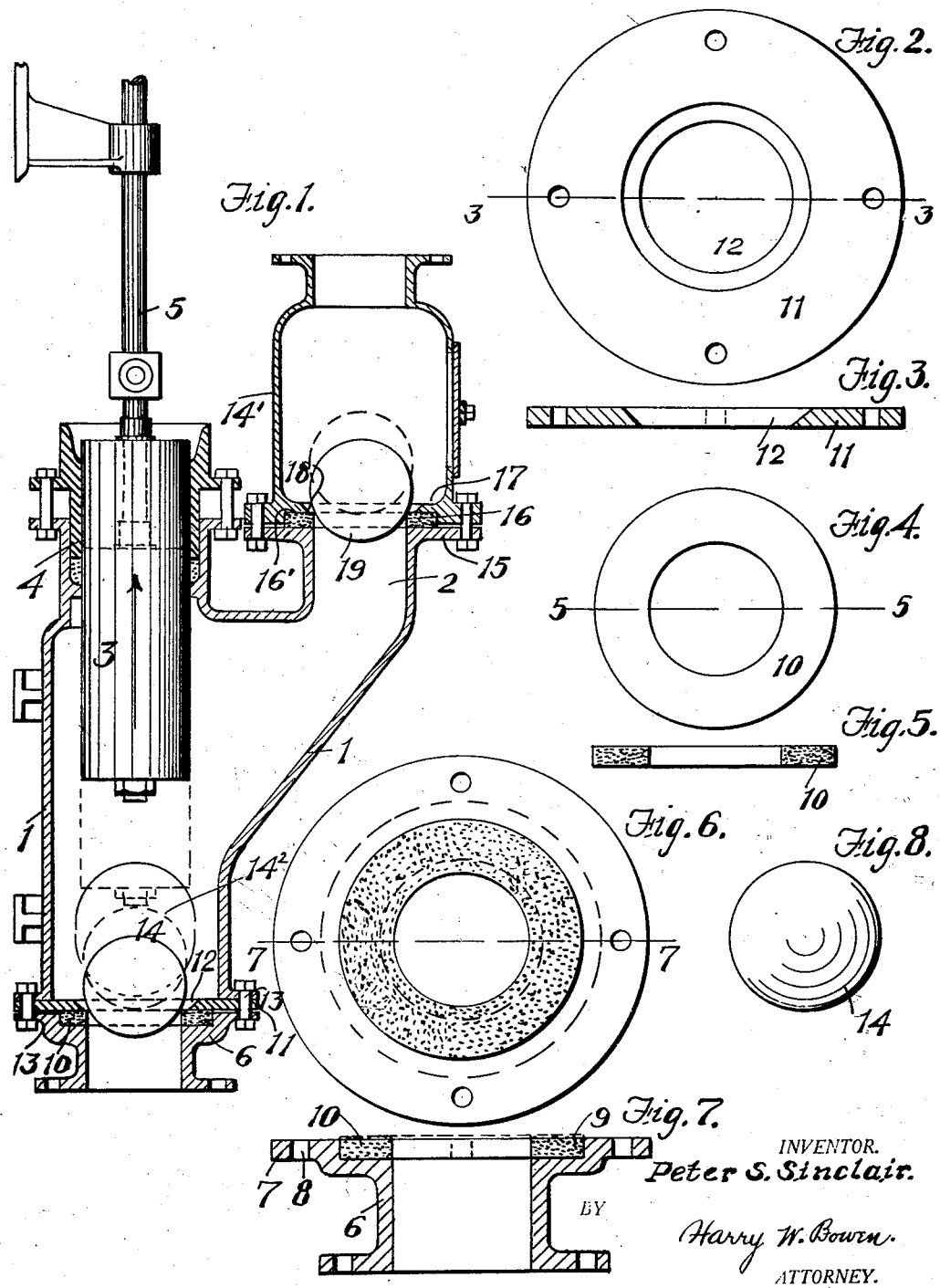
INVENTOR.
Peter S. Sinclair.
BY
Harry W. Bowen.
ATTORNEY.

Patented Dec. 7, 1926.

1,609,580

UNITED STATES PATENT OFFICE.

PETER S. SINCLAIR, OF HOLYOKE, MASSACHUSETTS, ASSIGNOR TO ELGIE D. LOMBARD, OF HOLYOKE, MASSACHUSETTS.

COMBINED VALVE SEAT AND PACKING RING.

Application filed January 8, 1924. Serial No. 685,069.

This invention relates to improvements in pumps and particularly for pumps that are employed for pumping what is known in the paper making art as "stuff" material. An object of the invention is to provide such a pump with a rubber packing or seat on which seats the spherical valve of cast bronze which is accurately turned, balanced, and finished, and, a further object is to provide a packing or seat device which will prevent hard particles of the pulp from being formed as it is a well known fact that when the seat of the pump is formed of rigid material as metal that the pulp is pinched or compressed so that small hard particles of the pulp appear in the finished paper.

A further object is to provide a pump packing which serves the double purpose of a seat for the valve and as a gasket for preventing leakage of the pump joints.

Referring to the drawings:

Fig. 1 is a vertical sectional view on a plane passing through the axis of the operating piston showing the two valve seats and packing rings in place and their cooperating spherical shaped valves.

Fig. 2 is a detail plan view of the metal ring which is employed for retaining the seat and packing ring in place.

Fig. 3 is a vertical sectional view on the line 3—3 of Fig. 2.

Fig. 4 is a detail plan view of the seat and packing ring member.

Fig. 5 is a vertical sectional view on the line 5—5 of Fig. 4.

Fig. 6 is a detail plan view of the base part of the pump showing the metal ring removed which retains the rubber seat and packing in place and illustrating the valve seat in place in the lower part of the pump.

Fig. 7 is a vertical sectional view on the line 7—7 of Fig. 6, and

Fig. 8 is an elevational view of one of the spherical valves removed from the pump.

Referring to the drawings in detail:

1 designates the main pump casing which is formed with the off set discharge part and opening 2 and in the upper end of which is located the cylindrically shaped piston 3. 4 designates a stuffing box for securing a water tight packing or joint between the piston and the opening in which it reciprocates. The piston rod is indicated at 5. Attached to the lower end of the casing 1 is a base piece or casting 6 of the pump which is formed with a flange portion 7, and openings 8 for attaching the casing thereto. This base piece is formed with an annular ledge or seat 9 in which is placed the valve seat and packing ring of rubber 10, or preferably of some suitable rubber composition.

Located between the lower part of the casing 1 and the base piece 6 is a valve seat clamping ring 11. This ring is formed with an opening 12 which is of a greater diameter than the inside diameter of the valve seat and packing ring 10. Bolts 13 are employed for securing the casing 1, clamping ring 11 and base piece 6 firmly together.

The clamping ring 11 it will be noticed engages the upper surface of the valve seat and packing ring 10, whereby the ring 10 is not only retained in place but a liquid tight joint is formed between the ring 11 and the valve seat and ring 10. Located on the ring 10 is the spherical shaped valve 14. This valve is preferably formed of bronze which is accurately machined and balanced. Attached to the upper end of the casing 1, which is the outlet end, is the discharge chamber 14' which is bolted to the flange part 15 of the main casing 1 and on this flange is placed the packing ring and valve seat 16 which is retained in place by the flange 17 of the discharge chamber casing 14'. This flange like the metallic ring 11 is formed with an opening 18 of greater diameter than the internal diameter of the ring 16. 19 is the spherical shaped bronze valve like the valve 14 that engages the rubber ring seat 16. When the piston is drawn upward the valve 14 is raised from its seat as indicated by the dotted line position 14².

The paper stock or "stuff" is then drawn into the casing 1 and on the downward movement of the piston 3 the valve 14 is closed or moved in to its full line position on the valve seat 10 and the valve 19 is then raised from the rubber packing seat 16, permitting the paper stock to be discharged to the beating engine or to a paper making machine. By employing a carefully finished bronze ball which contacts or engages the rubber valve seats 10 and 11, all possibility of hard lumps or bunches of pulp appearing in the pulp is avoided. The two spherical shaped valves 14 and 19 which engage the two rubber valve seats 10 and 16 therefore effectually prevent the formation of hard bunches in the pulp. An important feature of the present construction is that the rubber valve seat 10 serves the double purpose of a valve seat and packing which avoids the use of a gasket, since the height or thickness of the seat is normally greater than the vertical depth of the annular shaped surface 9 and the ring 16 is thicker, than the depth of the annular ring shaped part 16' as shown. It will, therefore, be seen that when the base 6, ring 11 and casing 1 is bolted together that a liquid tight joint is formed, also, when the parts 15, 16, and 17 are bolted together. An important feature of the present invention is, that when either one of the spherical ball valves 14 or 19 fall the force of the blow is taken up, or absorbed, by the rubber valve seat and packing before it seats on the metalic clamping ring 11 or flange 17, thereby preventing the valve from being scored or roughened. The valve as well as the ring 11 or flange 17 is therefore protected. In a stuff pump it is very essential that the valve does not pinch the pulp between the valve and its seat.

What I claim is:

In a pump valve of the character described, in combination, an enclosing casing, a base member formed with an annular ledge portion, an elastic valve seat and packing ring of rubber located on the annular ledge and of vertical thickness greater than the vertical depth of the annular ledge, a clamping ring placed on the said elastic ring and formed with an opening of greater diameter than the inside diameter of the said ring, and means including bolts for securing the base member, clamping ring and valve seat to the casing, the construction being such that the clamping ring is located between and near the outer edges of the enclosing casing and base member, said valve seat being designed for engagement by a metallic spherical valve.

PETER S. SINCLAIR.